United States Patent Office 2,868,821
Patented Jan. 13, 1959

2,868,821
PREPARATION OF p-XYLYLENE DIHALIDES

Rudolf Lotz, Klingenberg (Main), Germany, assignor to Vereinigte Glanzstoff-Fabriken A. G., Wuppertal-Elberfeld, Germany No Drawing. Application January 17, 1955
Serial No. 482,377

Claims priority, application Germany January 20, 1954

5 Claims. (Cl. 260—429.9)

This invention relates to a method for the production of p-xylylene dihalides, which includes the preparation of a new organic zinc compound and is based on the reaction of novel compounds on benzene.

pXylylene dichloride has been produced by the reaction of benzene with formaldehyde, a hydrogen halide and zinc chloride. In this reaction p-xylylene dichloride is formed, but owing to side reactions the product is contaminated, e. g., by the presence of diphenylmethane. The side reactions and the formation of impurities are due to the zinc chloride which acts as a Friedel-Crafts reagent, and to the water present during the reaction.

I have now found that p-xylylene dichloride or dibromide free from impurities is obtained if benzene is acted upon with a novel organic zinc compound, which forms on introduction of a dry hydrogen halide into a suspension of formaldehyde or paraformaldehyde and a corresponding zinc halide. As a suitable dispersing agent, I may use e. g. carbon tetrachloride or some other inert dispersing agent.

The introduction of hydrogen halide is started at ordinary temperature and the temperature is then moderately raised, e. g. to about 40–60° C., under constant stirring. When starting from well defined molecular quantities of the reactants, there is gradually formed an altogether limpid solution which becomes stratified so as to form two separate layers. The top layer consists of the dispersing agent which still contains small quantities of the dihalidedimethyl ether. The lower layer, which is altogether limpid, is an addition compound of zinc halide, formaldehyde and hydrogen halide. Exhaustive tests have shown this compound to be constituted according to the formula

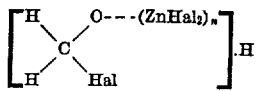

in which $n$ is $\frac{1}{2}$–$\frac{1}{4}$, while Hal stands for halogen.

This compound is a liquid. The chloride compound

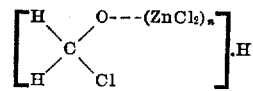

has a refractive index $n_D^{20°}=1.5040$, a density $D_{20}=1.88680$, its solution has a pH=1–2.

The corresponding Br-compound

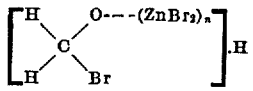

has a refraction index $n_D^{20°}=1.5450$, a density $D_{20}=2.0140$ and a pH of 1–2.

The lower layer can easily be separated. It forms a compound of high reactive power. If it is caused to act on benzene in the presence of an inert diluent and the reaction is started by a slight heating, an exothermic reaction yields p-xylylene dihalide. By using an inert diluent the course of the reaction is tempered and regulated. As a rule, the reaction is carried through under atmospheric pressure, but it will proceed also under increased pressure.

The invention may be illustrated by the following examples:

Example 1

*a.* First of all the organic zinc chloride compound constituted according to the formula mentioned above, is prepared by introducing into a suspension containing 150 g. carbon tetrachloride, 60 g. paraformaldehyde and 68 g. zinc chloride under constant stirring at a temperature rising slowly from 20° to 60° a moderately strong current of dry hydrogen chloride gas. Two layers are formed, the lower one of which is separated and constitutes the novel organic zinc compound.

*b.* To 128 g. of this compound there were added 20 g. benzene and the reaction was started by moderately heating to about 45° and not higher than 60°, whereupon a highly exothermic reaction set in. The temperature was maintained at 40–45° until the formation of p-xylylene dichloride was completed, whereupon it was recrystallized from methanol.

The yield of pure p-xylylene dichloride was about 60%, calculated on the starting material.

Example 2

*a.* The organic zinc compound was produced as described in Example 1.

*b.* 128 g. of this compound were caused to act in the presence of carbontetrachloride, acting as an inert diluent, on 20 g. benzene, the reaction mixture being centrifuged (e. g. by a "Turrax stirrer"). During the reaction the temperature was raised to not more than 60° and thereafter, on return to room temperature the p-xylylene dichloride was caused to precipitate and recrystallized from methanol. The yield amounted in this case to 55%.

Example 3

*a.* The organic zinc compound was produced as described in Example 1.

*b.* The reaction was carried out in the same manner and with the same quantities of reactants as described above, but the carbon tetrachloride was recycled. This procedure also permitted the carbon tetrachloride to be removed (which for a time caused the concentration of the reaction mixture to rise), but to be promptly replaced by a new charge of dispersing agent.

Various changes can be made in the way of proceeding and in the conditions under which the invention is performed without departing from the inventon and losing the advantages thereof.

I claim:

1. The method of preparing a compound selected from the class consisting of p-xylylene dichloride and p-xylylene dibromide which comprises reacting on benzene with an organic zinc compound constituted according to the formula

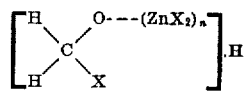

wherein $n=\frac{1}{2}$–$\frac{1}{4}$, and X=Cl or Br.

2. The method of preparing an organic zinc compound selected from the class consisting of

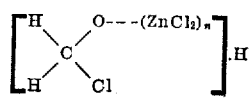

and

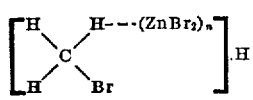

wherein $n=\frac{1}{2}-\frac{1}{4}$, which comprises introducing the corresponding hydrogen halide into a suspension of a compound selected from the class consisting of formaldehyde and paraformaldehyde, and the corresponding zinc halide, at a temperature gradually raised from about 20 to about 65° C., and recovering the organic zinc compound obtained at the bottom of the stratified suspension.

3. The method of claim 2, wherein carbon tetrachloride is used as a dispersing agent.

4. As a novel compound,

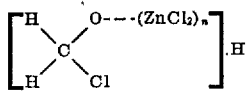

wherein $n=\frac{1}{2}-\frac{1}{4}$.

5. As a novel compound,

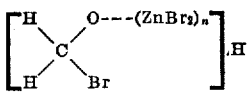

wherein $n=\frac{1}{2}-\frac{1}{4}$.

References Cited in the file of this patent

Stephen et al.: J. Chem. Soc., 1920, pp. 510–527.